(12) United States Patent
Vilca et al.

(10) Patent No.: US 11,926,381 B2
(45) Date of Patent: Mar. 12, 2024

(54) DYNAMICS-BASED ARTICULATION ANGLE ESTIMATOR FOR A VEHICLE COMBINATION

(71) Applicant: Volvo Truck Corporation, Gothenburg (SE)

(72) Inventors: José Vilca, Gothenburg (SE); Leon Henderson, Härryda (SE); Thorsten Helfrich, Gothenburg (SE); Jonathan Olsson, Mölndal (SE); Mats Jonasson, Partille (SE); Axel Ceder, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 193 days.

(21) Appl. No.: 17/573,711

(22) Filed: Jan. 12, 2022

(65) Prior Publication Data

US 2022/0227418 A1  Jul. 21, 2022

(30) Foreign Application Priority Data

Jan. 19, 2021 (EP) .................................... 21152300

(51) Int. Cl.
*B62D 6/04* (2006.01)
*G06N 20/00* (2019.01)
(Continued)

(52) U.S. Cl.
CPC .............. *B62D 6/04* (2013.01); *B60W 40/114* (2013.01); *B60W 60/001* (2020.02); *G06N 20/00* (2019.01); *B60W 2300/14* (2013.01)

(58) Field of Classification Search
CPC ..... B62D 6/04; B60W 40/114; B60W 60/001; B60W 2300/14; B60W 50/00;
(Continued)

(56) References Cited

U.S. PATENT DOCUMENTS 5,152,544 A   10/1992  Dierker, Jr. et al.
10,112,646 B2 * 10/2018  Lavoie ................. B62D 15/029
(Continued)

FOREIGN PATENT DOCUMENTS

DE    10201201914 A1    3/2014
DE    102018122273 A1   3/2020
(Continued)

OTHER PUBLICATIONS

Meng, Q. et al., "Analysis of the Dynamic Modeling Method of Articulated Vehicles," Journal of Engineering Science and Technology Review, vol. 10, No. 3, 2017, pp. 18-27.
(Continued)

*Primary Examiner* — Joseph J Dallo
(74) *Attorney, Agent, or Firm* — Withrow & Terranova, PLLC

(57) ABSTRACT

A system for estimating an articulation angle of a vehicle combination comprises a motion sensor for sensing one or more linear and/or angular motion quantities of the vehicle combination and a dynamics-based estimator configured to estimate state variables, including the articulation angle on the basis of the sensed motion quantities, wherein the dynamics-based estimator is dependent on one or more masses and moments of inertia of the vehicle combination.

12 Claims, 5 Drawing Sheets

(51) Int. Cl.
*B60W 60/00* (2020.01)
*B60W 40/114* (2012.01)

(58) Field of Classification Search
CPC . B60W 2050/0019; B60W 2050/0052; B60W 2520/10; B60W 2520/12; B60W 50/06; B60W 10/20; B60W 40/10; B60W 40/13; B60W 2040/1323; B60W 2420/00; B60W 2530/10; B60W 2540/18; B60W 2554/4042; B60W 2554/4043; G06N 20/00; B60T 8/1708; B60T 8/172; G06F 9/06; B60Y 2400/80
See application file for complete search history.

(56) References Cited

U.S. PATENT DOCUMENTS

| | | | |
|---|---|---|---|
| 10,173,722 B2* | 1/2019 | Pourrezaei Khaligh | ................... B60D 1/62 |
| 10,427,711 B2* | 10/2019 | Bland, III | ............ B62D 5/0457 |
| 10,496,892 B2* | 12/2019 | Son | ......................... G06T 7/60 |
| 2018/0001928 A1 | 1/2018 | Lavoie et al. | |
| 2019/0009815 A1 | 1/2019 | Lavoie et al. | |
| 2021/0139028 A1* | 5/2021 | Zhou | ................... B60W 30/143 |

FOREIGN PATENT DOCUMENTS

| | | |
|---|---|---|
| DE | 102019103742 A1 | 8/2020 |
| WO | 2013127410 A1 | 9/2013 |
| WO | WO-2020259878 A1 * 12/2020 | ............... B60T 7/20 |

OTHER PUBLICATIONS

Nilsson, P. et al., "Single-track models of an A-double heavy vehicle combination," Department of Applied Mechanics, Division of Vehicle Engineering and Autonomous Systems, Vehicle Dynamics Group, Chalmers University of Technology, 2013, Goteborg, Sweden, 28 pages.

Extended European Search Report for European Patent Application No. 21152300.6, dated Jun. 14, 2021, 7 pages.

* cited by examiner

DYNAMICS-BASED ARTICULATION ANGLE ESTIMATOR FOR A VEHICLE COMBINATION

RELATED APPLICATIONS

The present application claims priority to European Patent Application No. 21152300.6, filed on Jan. 19, 2021, and entitled "DYNAMICS-BASED ARTICULATION ANGLE ESTIMATOR FOR A VEHICLE COMBINATION," which is incorporated herein by reference in its entirety.

TECHNICAL FIELD

The present disclosure relates to the field of vehicular control and vehicular motion estimation. It proposes methods and devices for estimating an articulation angle between two connected vehicle units of a vehicle combination.

BACKGROUND

Accurate knowledge of the articulation angle (yaw angle) of a vehicle combination is valuable in vehicular control systems. Systems that may benefit from this information include assisted brake systems, trailer anti-swing control systems, low-speed maneuvering assistance systems and autonomous driving systems of various degrees of autonomy.

Mechanical and contactless sensors designed to capture a momentary value of an articulation angle are known in the art. As one example, U.S. Pat. No. 5,152,544 discloses a magnet carrying cap mounted in a fifth wheel, which can be coupled to the trailer king pin and carries magnetic means to form a magnetic sensor for sensing the articulation angle or one of the derivatives thereof. It is furthermore known to estimate the articulation angle on the basis of a time series of articulation angle measurements, e.g. by filtering, which tends to eliminate random errors and to improve the accuracy beyond that of a single measurement. A further development of this approach, as exemplified by DE102018122273, is to feed past and current measurement data into a kinematic vehicle model, from which an articulation angle estimate consistent with the measurement data can be extracted. The kinematic vehicle model may integrate a priori knowledge about the vehicle combination, such as values of wheel spacing, axle spacing, coupling point position that are proper to the vehicle combination type. The measurement data may relate to the articulation angle itself and/or to other relevant quantities, such as steering angle and speed.

US2019009815A1 discloses a trailer backup assist system for a vehicle reversing a trailer. The system is guided by a filtered hitch angle (articulation angle) $\gamma$, which a Kalman filter estimates on the basis of vehicle and trailer speed signals $v_1$, $v_2$ and of yaw rate sensor signals $\omega_1$, $\omega_2$. In normal operation, the Kalman filter repeatedly performs an update step, in which the filter's prediction $\hat{\gamma}(k)$ of the hitch angle is compared to a value $\gamma(k)$ derived from measurements. Because the kinematic relations between the hitch angle $\gamma$ and the kinematic sensor signals $v_1$, $v_2$, $\omega_1$, $\omega_2$ become unstable (singular) at low speed, the Kalman filter may temporarily enter a low-speed mode in which the latest good estimate is frozen, as per $$\hat{\gamma}(k+1)=\hat{\gamma}(k),$$

or in which the hitch angle is extrapolated without proper updating as $$\hat{\gamma}(k+1)=\hat{\gamma}(k)+(\omega_2(k)-\omega_1(k))T_s,$$

where $T_s$ is a sampling interval.

WO2013127410A1 discloses a system for monitoring the relative orientation of an articulated vehicle or a vehicle combination. The system comprises at least two sets of inertial sensor equipment which provide measurements of the linear or angular local acceleration. An evaluation unit receives the acceleration signals from the inertial sensor equipment and estimates the relative orientation on this basis. The estimation may include calculating a relative angle between two local reference frames. In some embodiments, the evaluation unit may be further configured to estimate a hitch angle between two vehicle units in a vehicle combination.

In some use cases and planned future applications, the available technical solutions for measuring or estimating the articulation angle do not fully meet the requirement for accuracy, reliability or both.

SUMMARY

One objective of the present disclosure is to make available methods and devices for estimating an articulation angle between two connected vehicle units of a vehicle combination. The invention as defined in the independent claim achieves this and other objectives. The dependent claims relate to advantageous embodiments.

In a first aspect of the invention, there is provided a system for estimating an articulation angle of a vehicle combination. The system comprises a motion sensor for sensing one or more linear and/or angular motion quantities of the vehicle combination and a dynamics-based estimator configured to estimate state variables including the articulation angle on the basis of the sensed motion quantities. The dynamics-based estimator is dependent on one or more masses and moments of inertia of the vehicle combination.

The inventors have realized that sideways scrubbing of trailer wheels represents an important error source in prior art model-based articulation angle estimators. Scrubbing essentially means that a wheel does not turn on its centerline like idealized kinematic models typically assume, whereby the steering angle does not always reliably indicate the time evaluation of the articulation angle. The quantitative extent of scrubbing varies with road conditions. It may affect multi-axle trailers considerably, especially when these make sharp turns. The scrubbing-originated errors are prone to accumulate in certain driving conditions, for example, when the vehicle combination moves in right-hand urban traffic with its typical asymmetric pattern of sharp right turns and gentle left turns. To overcome these problems, the invention relies on a dynamics-based estimator, which integrates masses and moments of inertia of the vehicle combination, whereby deviations from the ideal kinematic behavior can be tolerated without degrading the accuracy of the articulation angle estimate.

In various embodiments, the sensed linear and angular motion quantities include one or more of: a longitudinal velocity of a first vehicle unit, a longitudinal velocity of a second vehicle unit, a lateral velocity of a first vehicle unit, a lateral velocity of a second vehicle unit, a yaw rate of a first vehicle unit, a yaw rate of a second vehicle unit. All of these quantities can be accurately and reliably measured or estimated, using per se known sensors or filters. The steering angle may in some embodiments be excluded from the sensed linear and angular motion quantities.

In one embodiment, the dynamics-based estimator is supplemented by a kinematics-based estimator. A kinematics-based estimator may be independent of masses and moments of inertia of the vehicle combination but may include geometric characteristics. Because the kinematics-based estimator may outperform the dynamics-based estimator in some driving conditions, the simultaneous availability of their respective articulation angle estimates can be used to advantage.

Alternatively or additionally, the dynamics-based estimator may be supplemented by an articulation angle sensor. The articulation angle sensor may be a mechanical, optical, magnetic sensor or a sensor of any of the other types known in the art. The articulation angle sensor may be arranged at the kingpin of a tractor-trailer combination. Because the articulation angle sensor may outperform the dynamics-based estimator in some driving conditions, the simultaneous availability of these data sources can be used to advantage. In particular, the output of the dynamics-based estimator (or kinematics-based estimator, if available) may be used for recurring calibration of the articulation angle sensor.

In embodiments where the dynamics-based estimator is supplemented by a kinematics-based estimator and/or an articulation angle sensor, there may further be provided a selector configured to output either one of the available articulation angle values or to output a combined value obtained by merging the available articulation angle values. The merging may be uniform or non-uniform, in that some available articulation angle values are given greater weight than others, and may even exclude some of the available articulation angle values that are currently deemed to be of low accuracy. The selector may include a machine-learning (ML) model for purposes of selecting and/or merging available articulation angle values.

In a second aspect of the invention, there is provided a method of estimating an articulation angle of a vehicle combination. The method comprises: determining values, which are proper to the vehicle combination, of one or more masses and moments of inertia; defining a dynamics-based model of the vehicle combination on the basis of the determined values; repeatedly sensing one or more linear and/or angular motion quantities of the vehicle combination and feeding these to the model; and extracting an estimate the articulation angle from a current state of the model. It is noted that the steps of this method do not necessarily correspond to phases which are separated in time, nor are they necessarily performed in the sequence in which the claims recite them.

In a third aspect, the invention further provides a computer program containing instructions for causing a computer, or the articulation angle estimation system in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted, vehicle-mounted or portable.

The second and third aspects of the invention generally share the effects and advantages of the first aspect, and they can be embodied in a similarly varied manner.

A "vehicle combination", as per its general usage in this disclosure, encompasses any of a combination vehicle, an articulated vehicle, a decouplable truck-trailer combination and a road train. The vehicle combination may include two or more vehicle units. For specific embodiments, the term "vehicle combination" is given the stricter meaning of a combination of one powered (driven) vehicle unit and one or more non-powered vehicle units, wherein the powered vehicle may be a conventional or autonomous vehicle. The units making up a "vehicle combination" in this stricter sense are unable of operating as a combination while they are in the decoupled state, as opposed to powered vehicle units with a platooning capability. In still further embodiment, "vehicle combination" may exclude articulated vehicles (e.g., wheel loaders).

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
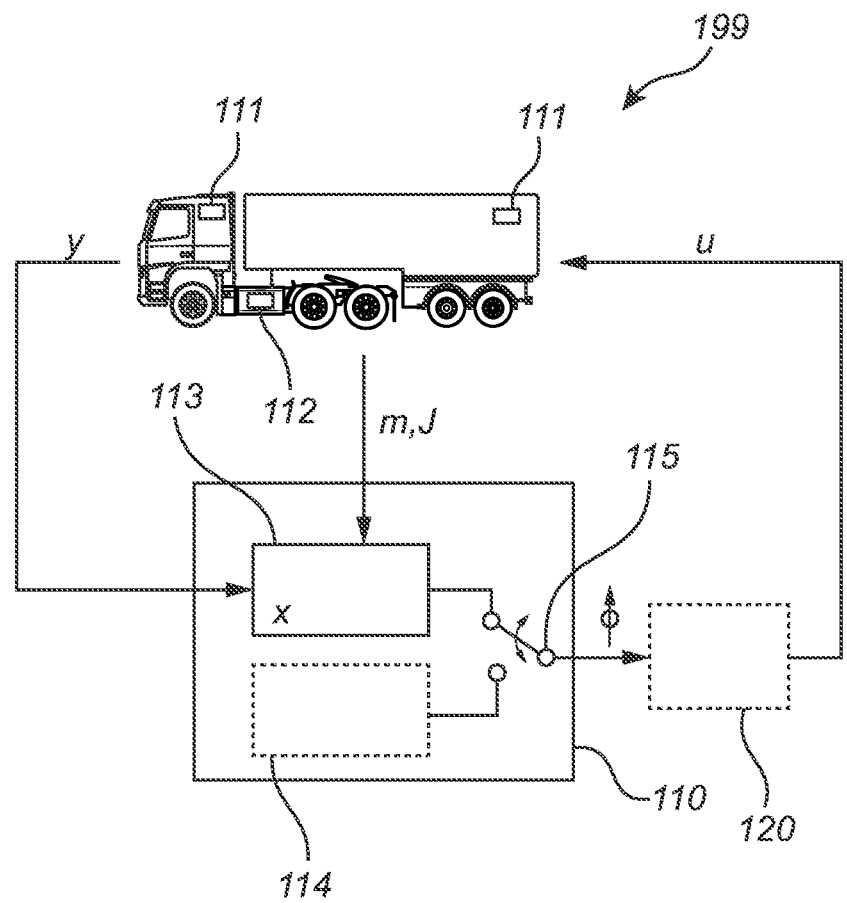
FIG. 1 is a schematic drawing of a vehicle combination and a system configured to estimate an articulation angle of the vehicle system on the basis of measurements y from sensors arranged in the vehicle combination.

FIG. 1 is a schematic drawing of a vehicle combination 199 and an associated system no configured to receive measurements y from sensors 111 in the vehicle combination 199 and to output, based thereon, an articulation angle estimate $\hat{\phi}$ which is close to the true articulation angle $\phi$ in a suitable sense. The closeness may be gauged in terms of (uniform) variance of the estimate, mean square error or another figure-of-merit; it is recalled that a Kalman filter is a minimum mean-square error estimator.

The lower portion of FIG. 1 further shows a regulator 120, which is configured to generate a control signal u based on the articulation angle estimate $\hat{\phi}$. The use of the articulation angle estimation system no together with the regulator 120 is an advantageous intended application of the invention, but the regulator 120 is not an essential component of the present invention. The regulator 120 may be configured to generate the control signal u, which may be fed to actuators in the tractor and/or trailer, in such manner as to allow autonomous or semiautonomous driving. Alternatively, the regulator 120 may be configured to provide different types of assistance to a human driver, e.g., anti-swing or controlled braking. With the possible exception of driving without human intervention, the regulator 120 may therefore include an interface (not shown) for receiving input from the driver, such as a steering-wheel signal or accelerator signal.

The system 110 and optional associated regulator 120 may be installed onboard the vehicle combination 199 (e.g., in one or more vehicle units thereof) or externally. In the case of external installation, the signals u, y may be communicated over a suitable wireless interface.

In the vehicle combination 199, the truck (first vehicle unit, powered) includes at least propulsion means, a braking system and steering arrangements. The propulsion means may include a central engine, electric wheel drives, transmission and further powertrain components. The trailer (second vehicle unit, non-powered) may include a braking system and subsidiary propulsion system for reinforcing braking and/or forward acceleration, arrangements for adjusting wheel angles during motion to be more compatible with movements of the truck, a cooler or heater with an independent energy source, and similar installations. The trailer's braking system may be of a passive type (e.g., overrun brake) or include an active braking functionality controlled from the truck. The trailer's ability to move may be conditional on it being coupled to the truck. The truck and trailer comprise respective coupling means (e.g., drawbar, kingpin, fifth wheel), which can be engaged to form a solid coupling and then disengaged to decouple the vehicle units from each other. In vehicle combinations 199 with three or more vehicle units, including a so-called Nordic combination, the present invention can be advantageously applied in the estimation of the articulation angle between any pair of successive vehicle units. Accordingly, it may estimate the articulation angle between the tractor and first trailer just as well as the articulation angle between the first and second trailers. While the first and second trailers run as second and third carriages in sequence, they may nevertheless be understood at first and second vehicle units in the sense of the present disclosure.

The sensors 111 in the vehicle combination 199 may be configured to capture linear and angular motion quantities, including a longitudinal velocity of the first vehicle unit, a longitudinal velocity of the second vehicle unit, a lateral velocity of the first vehicle unit, a lateral velocity of the second vehicle unit, a yaw rate of the first vehicle unit and/or the yaw rate of a second vehicle unit. Alternatively or additionally, the sensors 111 may be configured to capture time derivatives or integrals of these quantities, such as a longitudinal position, a longitudinal acceleration, a yaw pose etc. Example sensor types include pulse counters and inertial instruments.

Figure 3:
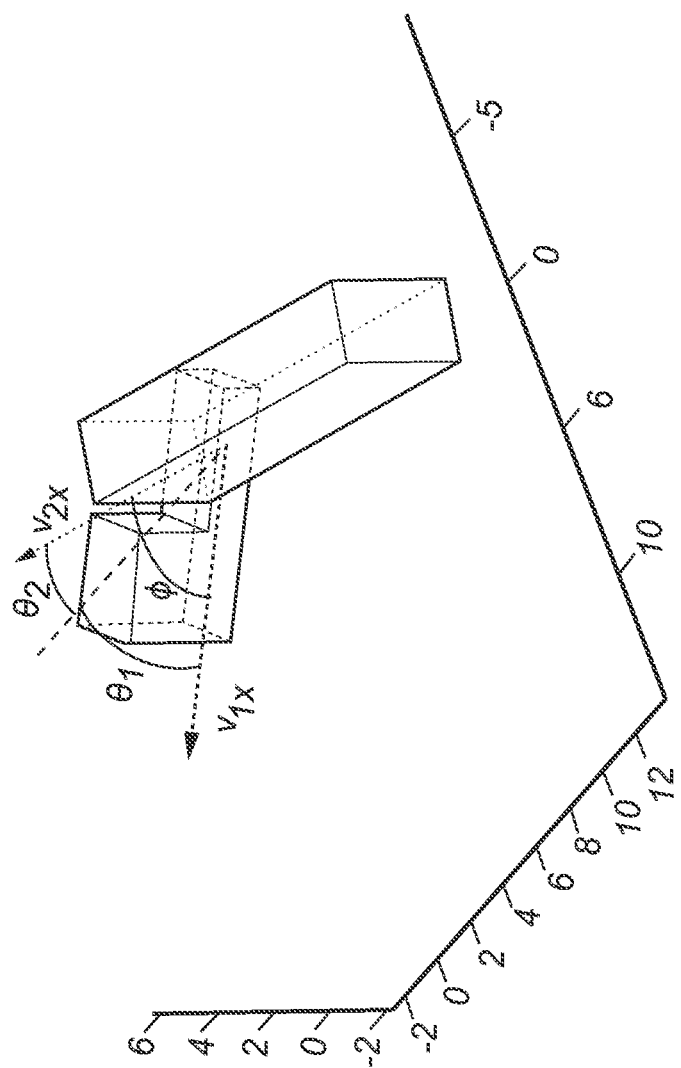
FIG. 3 is a three-dimensional schematic visualization of a turning tractor-trailer combination with a non-zero articulation angle $\phi$.

The sensors 111 may perform indirect measurements of the mentioned quantities; for example, the following conversion formula between the yaw rate $\dot{\theta}$, axle-center longitudinal velocity $v_x$, and the left and right wheel velocities $v_L$, $v_R$ is known:

$$v_L + \frac{\dot{\theta} w}{2} = v_x = v_R - \frac{\dot{\theta} w}{2},$$

where w is the wheelbase width. The wheelbase width may be equal to the spacing of the wheel centers. On this basis, wheel velocity sensors may replace a yaw rate sensor in some embodiments, and vice versa. The yaw angles and longitudinal velocities of the vehicle units are illustrated together with the articulation angle in FIG. 3.

In the system 110 shown in FIG. 1, a dynamics-based estimator 113 is responsible for generating the articulation angle estimate $\hat{\phi}$ on the basis of the measurement vector y. The dynamics-based estimator 113 may be implemented as a Kalman filter which maintains state variables x and updates these on the basis of the measurements y. The Kalman filter may be a basic Kalman filter, an extended Kalman filter (EKF) or an unscented Kalman filter (UKF); the two latter options are designed for handling nonlinear models.

By way of example and not limitation, a nonlinear dynamic single-track model of the vehicle combination 199 shown in FIG. 2 will now be described together with the assumptions on which it is based. Those skilled in the art are able without undue burden to generalize the model to suit other vehicle combinations, with different wheel arrangements and/or a different numbers of units. The model includes the following state variable vector:

$$x = \begin{bmatrix} v_x^{(1)} \\ v_y^{(1)} \\ v_x^{(2)} \\ v_y^{(2)} \\ \dot{\theta}_1 \\ \dot{\theta}_2 \\ \phi \end{bmatrix},$$

measurement vector:

$$y = \begin{bmatrix} v_x^{(1)} \\ v_x^{(2)} \\ \dot{\theta}_1 \\ \dot{\theta}_2 \end{bmatrix},$$

control signal vector:

$$u = \begin{bmatrix} u(1) \\ u(2) \\ u(3) \\ u(4) \end{bmatrix}$$

and evolution operator (prediction):

$$x_{k+1} = x_k + T \times \begin{bmatrix} \frac{1}{m_1}\left(F_x^{(1v)} + u(2) + u(3) + P_x^{(1)}\right) + x_k(5)x_k(2) \\ \frac{1}{m_1}\left(F_y^{(1f)} + F_y^{(1r)} + P_y^{(1)}\right) - x_k(5)x_k(1) \\ \frac{1}{m_2}\left(u(4) + P_x^{(2)}\right) + x_k(6)x_k(4) \\ \frac{1}{m_2}\left(F_y^{(1r)} + P_y^{(2)}\right) - x_k(6)x_k(3) \\ \frac{1}{J_1}\left(F_y^{(1f)}l_f^{(1)} - F_y^{(1r)}l_r^{(1)} - P_y^{(1)}l_c^{(1)} + M^{(1)}\right) \\ \frac{1}{J_2}\left(P_y^{(2)}l_c^{(2)} - F_y^{(2r)}l_r^{(2)} + M^{(2)}\right) \\ x_k(6) - x_k(5) \end{bmatrix}.$$

The following notation is used:

TABLE 1

List of symbols

| | |
|---|---|
| $\dot{\theta}_1$ | yaw rate of vehicle unit 1 |
| $\dot{\theta}_2$ | yaw rate of vehicle unit 2 |
| $\phi$ | articulation (yaw) angle between vehicle unit 1 and vehicle unit 2 |
| $\hat{\phi}$ | estimate of $\phi$ |
| $F_x^{(1v)}$ | longitudinal force on vehicle unit 1 |
| $F_y^{(1f)}$ | lateral force on front axle of vehicle unit 1 |
| $F_y^{(1r)}, F_y^{(2r)}$ | lateral force on rear axle of vehicle unit 1, 2 |
| $J_1$ | yaw moment of inertia with respect to center of gravity $0_1$ of vehicle unit 1 |
| $J_2$ | yaw moment of inertia with respect to center of gravity $0_2$ of vehicle unit 2 |
| $l_0$ | distance (horizontal) from first axle to simplified axle |
| $l_w^{(1)}, l_w^{(2)}$ | axle spacing (horizontal) in vehicle unit 1, 2 |
| $l_c^{(1)}$ | distance (horizontal) to articulation point P from center of gravity $0_1$ of vehicle unit 1 |
| $l_c^{(2)}$ | distance (horizontal) to articulation point P from center of gravity $0_2$ of vehicle unit 2 |
| $l_f^{(1)}$ | distance (horizontal) to front axle from center of gravity $0_1$ of vehicle unit 1 |
| $l_r^{(1)}$ | distance (horizontal) to rear axle from center of gravity $0_1$ of vehicle unit 1 |
| $l_r^{(2)}$ | distance (horizontal) to rear axle from center of gravity $0_2$ of vehicle unit 2 |
| $M^{(1)}, M^{(2)}$ | torque on simplified axle of vehicle unit 1, 2 |
| $m_1, m_2$ | mass of vehicle unit 1, 2 |
| P | articulation point |
| $P_x^{(1)}, P_x^{(2)}$ | longitudinal coupling force on vehicle unit 1, 2 |
| $P_y^{(1)}, P_y^{(2)}$ | lateral coupling force on vehicle unit 1, 2 |
| T | time step |
| u | control signal |
| u(1) | steering signal of vehicle unit 1 |
| u(2) | propulsion force (longitudinal) of vehicle unit 1 |
| u(3) | brake force (longitudinal) of vehicle unit 1 |
| u(4) | brake force (longitudinal) of vehicle unit 2 |
| $v_x^{(1)}, v_x^{(2)}$ | longitudinal speed of vehicle unit 1, 2 |
| $v_y^{(1)}, v_y^{(2)}$ | lateral speed of vehicle unit 1, 2 at center of gravity |
| $v_y^{(1c)}, v_y^{(2c)}$ | lateral speed of vehicle unit 1, 2 at articulation point |
| x | states |
| y | measurement signal |

Figure 4:
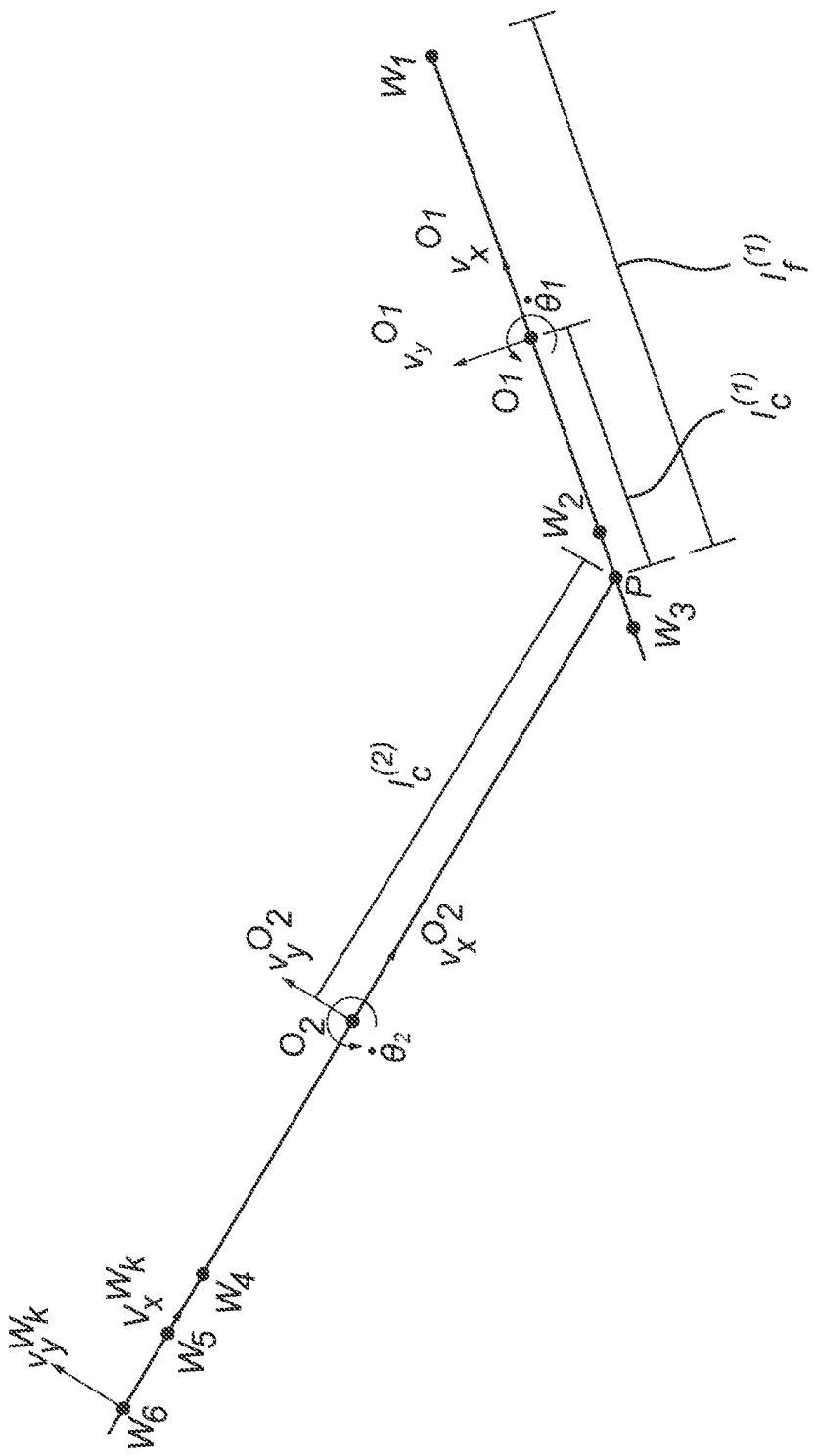
FIG. 4 illustrates a single-track model of a tractor-trailer combination.

FIG. 4 is a top view of a tractor-trailer combination showing some of the above-defined quantities. The tractor has one front axle $W_1$ and a group of two rear axles $W_2$, $W_3$. The trailer (semitrailer, bogie) has a group of three rear axles $W_4$, $W_5$, $W_6$; it rests on the trailer at the articulation point P and is horizontally rotatable round this point.

The evolution operator introduced above corresponds to one or more of the following physical relations:
constitution for axles on first vehicle unit,
compatibility (shifting of lateral velocity within first vehicle unit),
constitution for axles on second vehicle unit,
equilibrium of coupling,
constitution for coupling,
dynamic equilibrium of first vehicle unit, and
dynamic equilibrium of second vehicle unit followed by time-discretization at step size T and partial linearization. The resulting evolution equations depend parametrically on the masses $m_1$, $m_2$ and yaw moments of inertia $J_1$, $J_2$ of the vehicle units. Because these masses and moments of inertia are load-dependent quantities, their values may be updated for each driving mission in utility vehicles configured to operate with highly varying loads. The update may relate to one vehicle unit or several vehicle units in the vehicle combination 199. The up-to-date values may be captured by internal sensors (e.g., strain sensors mounted on loaded elements) or external sensors (e.g., weighbridge). In a simplified implementation, the driver or an assisting system may be able to select modes such as "empty", "half load", "full load" corresponding to approximate values of the masses and moments of inertia.

The equations within the evolution operator include torques and forces not forming part of the measurement vector y. These can be readily computed from the vehicle unit speeds and yaw rates by applying constitutive equations, equilibrium and/or compatibility.

Figure 5:
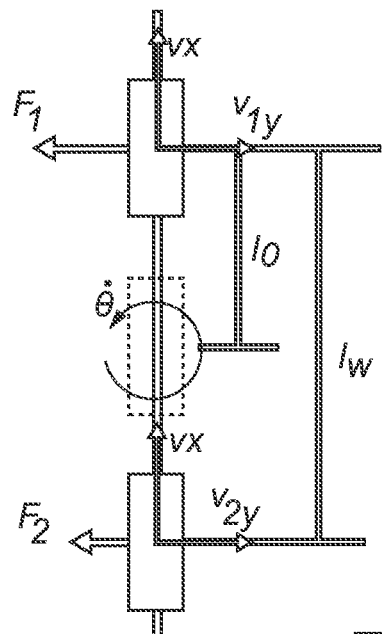
FIG. 5 illustrates the modeling of a group of two vehicle axles as one simplified axle.
Figure 6:
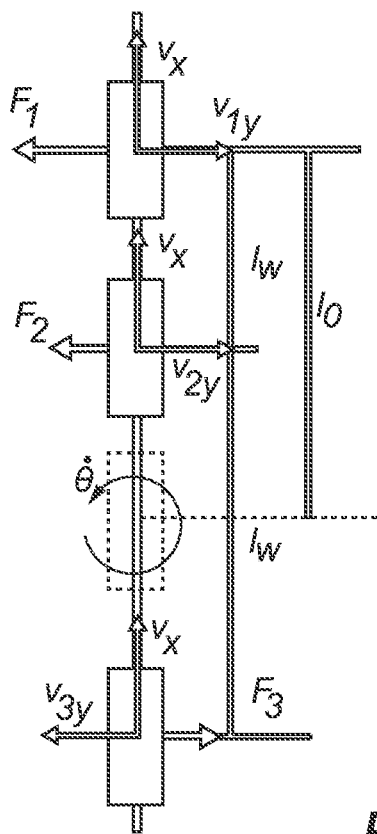
FIG. 6 illustrates the modeling of a group of three vehicle axles as one simplified axle.

In the present example, more precisely, the computations rely on a simplified model of axle groups, as illustrated in FIGS. 5 and 6. FIG. 5 shows a group of two rear tractor axles with spacing $l_w^{(1)}$, with respective lateral forces $F_1$, $F_2$ and lateral velocities $v_{1y}$, $v_{2y}$, a common longitudinal velocity $v_x^{(1)}$ and yaw rate $\dot{\theta}_1$. Assuming that the wheels have equal cornering stiffness values, requiring compatibility within each axle, and placing the simplified (imaginary) axle midway between the axles (e.g., $l_0 = l_w^{(1)}/2$), the torque simplifies into $$M^{(1)} = \frac{\dot{\theta}_1 \left(l_w^{(1)}\right)^2}{8\left|v_x^{(1)}\right|}.$$

FIG. 6 shows a group of three trailer axles with spacings $l_w^{(2)}$, with respective lateral forces $F_1$, $F_2$, $F_3$ and lateral velocities $v_{1y}$, $v_{2y}$, $v_{3y}$ and a common longitudinal velocity $v_x^{(2)}$ and yaw rate $\dot{\theta}_2$. Similar to the case shown in FIG. 5, it may be shown under certain assumptions that the torque on an imaginary axle located $l_0 = 3l_w^{(2)}/2$ unit behind the first axle is given by $$M^{(2)} = \frac{2\dot{\theta}_2 \left(l_w^{(2)}\right)^2}{3\left|v_x^{(2)}\right|}.$$

The forces on the front and rear (simplified) axles as well as the coupling forces may be computed on the basis of constitutive equations for the coupling (these may depend parametrically on the articulation angle $\phi$), equilibrium of the coupling and respective dynamic equilibria of the tractor and trailer. Together with the control signal u, this information allows the evolution operator to be evaluated.

For updating the Kalman filter constituting the dynamics-based estimator 113, a direct measurement model may be employed:

$$\hat{y} = \begin{bmatrix} v_x^{(1)} \\ v_x^{(2)} \\ \dot{\theta}_1 \\ \dot{\theta}_2 \end{bmatrix}.$$

As an alternative to measuring the quantities directly, an indirect model may be used, in which the measurements are described with reference to states relating to the other vehicle unit. Requiring equal lateral velocity at the articulation point P, one obtains $$\hat{y} = \begin{bmatrix} v_x^{(2)}\cos\phi + v_y^{(2c)}\sin\phi \\ v_x^{(1)}\cos\phi - v_y^{(1c)}\sin\phi \\ \dfrac{v_y^{(1)} - \left(v_x^{(2)}\sin\phi + v_y^{(2c)}\cos\phi\right)}{l_c^{(1)} - l_f^{(1)}} \\ \dfrac{-v_y^{(1)} + \left(v_x^{(2)}\sin\phi + v_y^{(1c)}\cos\phi\right)}{l_c^{(2)}} \end{bmatrix}.$$

Figure 2:
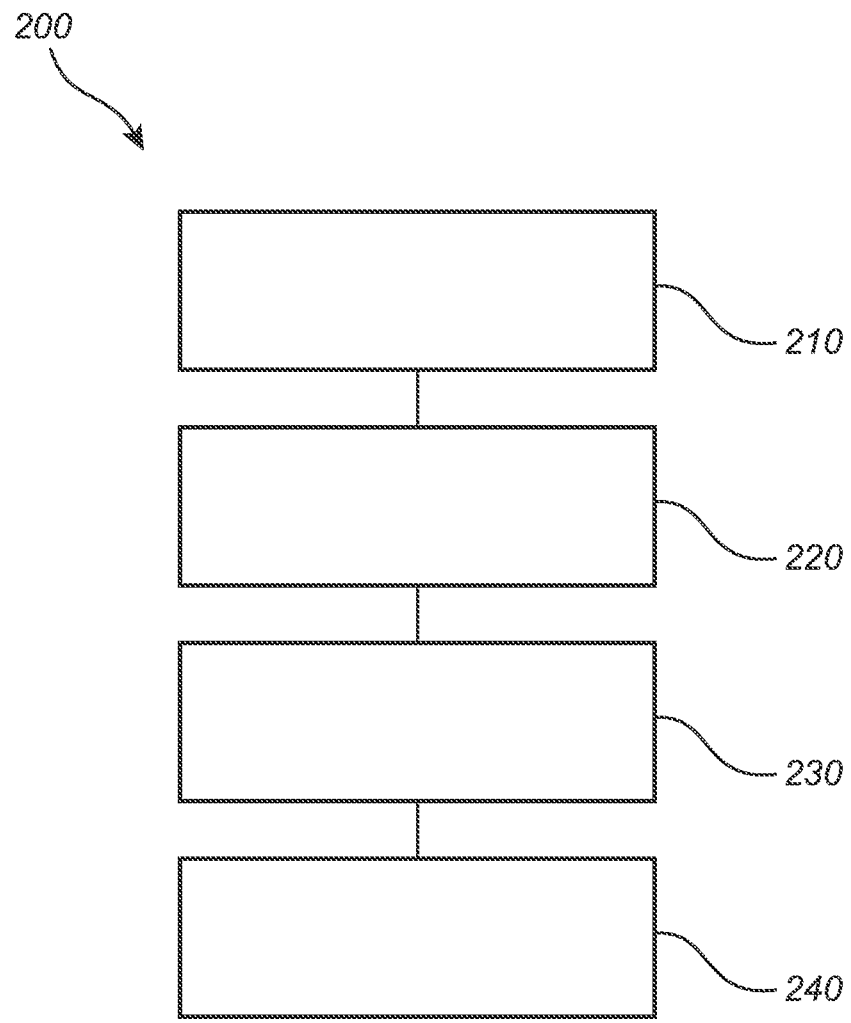
FIG. 2 is a flowchart of a method for estimating an articulation angle of a vehicle combination, according to an embodiment of the invention.

The behavior of the basic embodiment described so far can be summarized in terms of a method 200 for estimating an articulation angle, as illustrated in FIG. 2.

In an initial step 210, values—proper to the vehicle combination 199 or vehicle combinations of the same type—of the masses and/or moments of inertia are determined. The determination may include reading a value from a specification of the vehicle type or from an inspection protocol, receiving user input, having a measurement performed to establish the mass or moment prevailing at the current point in time, or may include estimating these quantities by an indirect measurement.

In a second step 220, a dynamics-based model of the vehicle combination on the basis of the determined values is defined. This is to say, the determined values may be inserted into a dynamics-based vehicle combination model with non-constant parameters, as described above. For example, evolution (prediction) equations of a linear or nonlinear Kalman filter may depend parametrically on the values of the mass or moment of inertia.

In a third step 230, one or more linear and/or angular motion quantities of the vehicle combination are sensed and fed as signal y to the model. As described, the sensing may utilize sensors capturing the measurement quantities directly, or may be structured as an indirect measurement that includes measuring different quantities and performing a calculation. The linear and/or angular motion quantities of the vehicle combination may be used to compute initial states of the model. Alternatively, they may be used in an update step for a Kalman filter, in which the measured quantities are predicted from the current state of the model and compared with the true (measured) values.

In a fourth step 240, an estimate $\hat{\phi}$ of the articulation angle is extracted from a current state of the model. The time evolution of the vehicle combination system since the latest measurement point may be simulated by means of the evolution operator, as needed.

The fourth step 240 may be repeated whenever such entities which use the articulation angle estimate $\hat{\phi}$ as input (e.g., regulator 120, assisted brake system, trailer anti-swing control system, low-speed maneuvering assistance system, autonomous driving system) require a fresh value. Similarly, the third step 230 may be repeated as often as is deemed necessary from the point of view of data quality. The availability of relatively frequent measurements may render it easier to maintain the articulation angle estimate $\hat{\phi}$ close to the true articulation angle $\phi$, although the estimation accuracy may be influenced by the model quality and various other factors as well. The initial step 210 may be renewed when the loading conditions have changed significantly (e.g., beginning of new drive mission), or when other factors suggests that the data quality benefit outweighs the cost in time, processing or occupancy of a shared resource.

In some embodiments, the system no may further include a kinematics-based estimator 114. A kinematics-based estimator may be independent of masses and moments of inertia of the vehicle combination but may include geometric characteristics. It may be a single-track kinematic model with an assumption of zero wheel slip (or equivalently, with zero lateral wheel velocity); see for example P. Nilsson et al., "Single-track models of an A-double heavy vehicle combination", *Technical reports in Applied Mechanics* 2013:08, Chalmers University of Technology (2013). This and other types of kinematics-based estimators 114 have been described in isolation in the literature, though the applicant is unaware that any of these has been combined with a dynamics-based estimator 113 in the manner described herein.

In further embodiments, the system 110 receives data from an articulation angle sensor 112 in the vehicle combination 199. The articulation angle sensor 112 may be a mechanical, optical, magnetic sensor or a sensor of any of the other types known in the art. The articulation angle sensor 112 may be arranged at the kingpin of a tractor-trailer combination, like in the initially cited disclosure U.S. Pat. No. 5,152,544.

In embodiments where the system 110 includes one or more secondary data sources, such as an articulation angle sensor 112 or a kinematics-based estimator 114, there may further be provided a selector 115. The selector 115 is simplistically drawn in FIG. 1 as a switch, but may be implemented in a commercial product as a software or logic unit configured to indicate at each point in time the most accurate data source and/or to grade the accuracy of each data source. This way, the selector 115 may output the currently best estimate of the articulation angle $\phi$. In some embodiments, the selector 115 may further form a weighted average (or another merged value) of the estimates from the respective data sources, wherein the weighting may correspond to the graded accuracy. The selector 115 may base its decision-making on signal quality (e.g., variance, noise) or by sensing environmental quantities (e.g., vehicle and loading conditions, driving history, light and meteoro-logical conditions) believed to influence the data accuracy. Regardless of the decision basis, the decision-making of the selector 115 may be guided by a voting algorithm.

In some embodiments, the selector 115 may be implemented as a machine-learning (ML) model. The ML model may for example be implemented as a neural network, a genetic algorithm, a support vector machine (SVM), K-means, kernel regression or other suitable structures. The ML model may be trained before it is put to service on the basis of articulation angle estimates from the data sources under consideration and simultaneous values of the true articulation angle $\phi$ (ground truth). The training data may further include the environmental quantities exemplified above.

Additionally or alternatively, the selector 115 may be configured to indicate a quality of a confidence level of its output. The quality or confidence level may be based either on the quality of each estimate or measurement that the selector 115 receives, or it may be predicted by the ML model. The ML model may have been trained for this purpose based on the ML model's own articulation angle output (selected from the data sources) and simultaneous values of the true articulation angle $\phi$. The usefulness of knowing the quality or confidence level is manifold. To cite one example, the quality may be consumed by a downstream entity, such as a vehicle controller, as input to a risk-avoidance scheme that allows tentative vehicle maneuvers only to the extent they are based on articulation angle data with a quality above a prescribed threshold.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A system for estimating an articulation angle of a vehicle combination, the system comprising:
    a motion sensor for sensing one or more linear and/or angular motion quantities of the vehicle combination;
    a dynamics-based estimator configured to
        estimate state variables including the articulation angle on the basis of the sensed motion quantities, wherein the dynamics-based estimator is dependent on one or more masses and moments of inertia of the vehicle combination; and
        provide vehicle control information based on the estimated state variables to a vehicle controller.

2. The system of claim 1, wherein the dynamics-based estimator is a Kalman filter.

3. The system of claim 1, wherein the sensed linear and angular motion quantities include one or more of:
    a longitudinal velocity of a first vehicle unit,
    a longitudinal velocity of a second vehicle unit,
    a lateral velocity of the first vehicle unit,
    a lateral velocity of the second vehicle unit,
    a yaw rate of the first vehicle unit, and
    a yaw rate of the second vehicle unit.

4. The system of claim 1, wherein the sensed linear and angular motion quantities do not include a steering angle.

5. The system of claim 1, further comprising:
    a kinematics-based estimator configured to estimate state variables including the articulation angle on the basis of the sensed motion quantities, wherein the kinematics-based estimator is independent of the masses and the moments of inertia of the vehicle combination.

6. The system of claim 1, further comprising:
    an articulation angle sensor.

7. The system of claim 5, further comprising:
    a selector configured to output one of:
        an estimate by the dynamics-based estimator,
        an estimate by the kinematics-based estimator,
        a measurement of the articulation angle, and
        a value obtained by merging one or more of the above.

8. The system of claim 7, wherein the selector includes a machine-learning model.

9. The system of claim 7, wherein the selector is further configured to indicate a quality or confidence level of its output.

10. The system of claim 1, wherein the vehicle combination is not an articulated steering vehicle (ASV).

11. A method of estimating an articulation angle of a vehicle combination, comprising:
    determining values based on the vehicle combination of one or more masses and moments of inertia;
    defining a dynamics-based model of the vehicle combination on the basis of the determined values;
    repeatedly sensing one or more linear and/or angular motion quantities of the vehicle combination and feeding these to the model;
    extracting an estimate of the articulation angle from a current state of the model; and
    providing vehicle control information based on the estimate of the articulation angle to a vehicle controller.

12. A computer program comprising a non-transitory computer readable medium having stored thereon instructions which, when the program is executed by a computer, cause the computer to:
    determine values based on the vehicle combination of one or more masses and moments of inertia;
    define a dynamics-based model of the vehicle combination on the basis of the determined values;
    repeatedly sense one or more linear and/or angular motion quantities of the vehicle combination and feeding these to the model;
    extract an estimate of the articulation angle from a current state of the model; and
    providing vehicle control information based on the estimate state of the articulation angle to a vehicle controller.

* * * * *